UNITED STATES PATENT OFFICE.

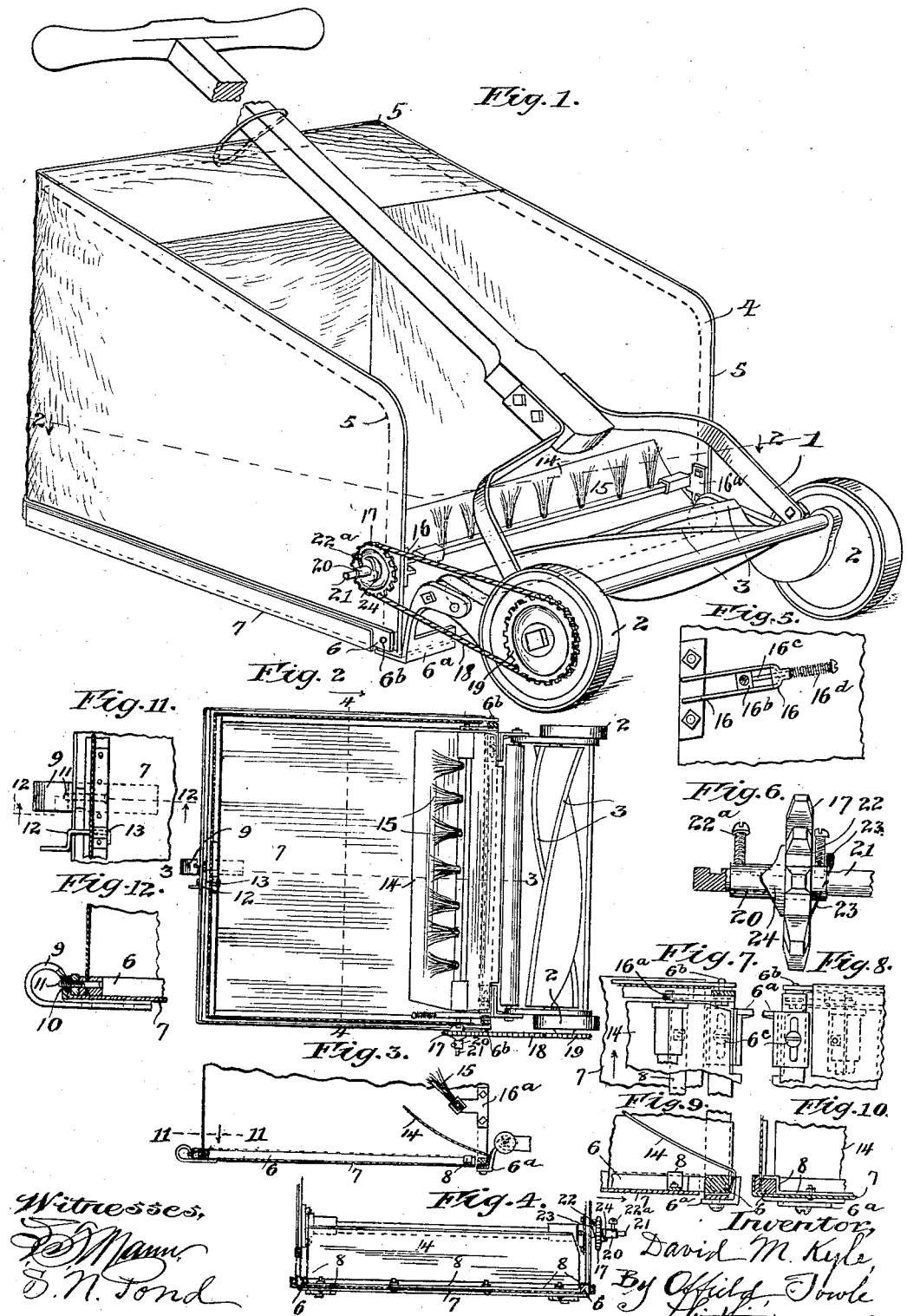

DAVID M. KYLE, OF CHICAGO, ILLINOIS.

POWER-TRANSMITTING MECHANISM.

No. 907,510.  Specification of Letters Patent.  Patented Dec. 22, 1908.

Application filed March 23, 1905. Serial No. 251,616.

*To all whom it may concern:*

Be it known that I, DAVID M. KYLE, a citizen of the United States, and a resident of Chicago, in the county of Cook and State of Illinois, have invented certain new and useful Improvements in Power - Transmitting Mechanism, of which the following is a specification.

This invention relates to power-transmitting mechanism designed more particularly for use on lawn mowers, and consists of a novel means for transmitting rotation from a driving shaft, such as the shaft of a ground wheel of the mower to a driven shaft, such as the rotary brush shaft of the mower in one direction only, so that the driven shaft will rotate only on the forward movement of the mower, but will be idle on the rear or backward movement.

In the accompanying drawings,—Figure 1 is a perspective view of a lawn mower with my improvement applied thereto; Fig. 2 is a sectional plan view taken approximately on the line 2—2 of Fig. 1 with parts omitted; Fig. 3 is a sectional view on the line 3—3 of Fig. 2; Fig. 4 is a sectional view on the line 4—4 of Fig. 3; Fig. 5 is a detail view of a belt tightener; Fig. 6 is a detail view of a sprocket wheel; Fig. 7 is an enlarged detail plan view of one of the forward corners of the grass catcher; Fig. 8 is an inverted plan view of the parts shown in Fig. 8; Fig. 9 is a view looking in the direction of the arrow in Fig. 7; Fig. 10 is a view looking in the direction of the arrow in Fig. 9; Fig. 11 is an enlarged detail plan view on the line 11—11 of Fig. 3; and Fig. 12 is a view taken on the line 12—12 of Fig. 11.

In the drawings, 1 represents a lawn mower as an entirety, 2—2 the ground wheels, 3—3 the cutting knives, and 4 a grass catcher. The grass catcher is a rectangular box-shaped structure having flexible canvas side and back walls secured to a metal frame 5, and a bottom frame 6. The bottom 7 is made of sheet metal to prevent wear from the frictional contact with the ground and has at its forward end a metal strip 8 secured thereto and providing a guide piece whereby the bottom is made slidable with the bottom frame 6, the ends of said strip being suitably bent to ride over the parallel lower side members of the bottom frame 6. A handle 9 is secured with the bottom 7 and is apertured at 10 to receive the end of a bolt 11 thereby locking the bottom with the frame 6. A bent latch 12 rotatably secured to the frame 6 at 13 affords means for insuring the locked engagement of the bottom and frame. Slotted castings 6ᵃ are adjustably secured to the bottom frame 6 as by clamping bolts 6ᶜ, and afford means for securing the grass catcher to the lawn mower. This enables the grass catcher to be applied to mowers of varying widths.

A spring plate 14 is secured upon the frame 6 at its forward end and receives the cut grass as it is thrown back by the cutting knives. The frames 5 and 6 are pivotally secured together at 6ᵇ. A brush 15 is rotatably secured in the castings 16 and 16ᵃ upon the frame 5 and has adjustably secured on its shaft 21 a sprocket wheel 17 which is driven by a sprocket chain 18, which chain is driven by a sprocket wheel 19 upon the ground wheel 2. A belt or chain tightener is provided in the casting 16 consisting of a slidable block 16ᵇ through which the shaft of the brush 15 passes, said block having a bolt extension 16ᶜ provided with a spring 16ᵈ interposed between the head of the bolt and the casting 16.

The sprocket wheel 17 is loosely mounted upon a short sleeve 20, which sleeve is mounted upon the shaft 21 of the brush 15, being adjustably secured thereto by the set-screws 22 and 22ᵃ. The sprocket wheel 17 is of novel construction, having upon its inner side a locking lug 23, which lug is so formed at one end as to operatively engage the set-screw 22, thereby causing the brush to rotate when the lawn mower is moved in a forward direction; while its other end is inclined, so that when the lawn mower is moved backward, and the chain drives the sprocket wheel in the opposite direction, said sprocket wheel moves laterally away from the set-screw 22, turning loosely upon the sleeve section and thereby preventing a reverse movement of the brush 15. The next forward movement of the lawn mower will cause a cam lug 24 on the outer side of the sprocket 17 to strike the set-screw 22ᵃ and thereby throw the sprocket wheel sidewise back into locking engagement with the set-screw 22, as seen in Fig. 6.

The impact of lug 24 with the set-screw 22ᵃ in practice has been found sufficient to cause a complete locking engagement of the locking lug with the set-screw 22.

The sprocket 17 might be mounted directly on the brush shaft; but the adjustable sleeve 20 adapts the device to mowers of varying widths.

Without limiting myself to precise details of construction, I claim:—

1. The combination with a driving shaft and a driven shaft, of a sprocket wheel fast on said driving shaft, a sprocket wheel slidably and rotatably mounted upon the driven shaft, a sprocket chain connecting said sprocket wheels, fixed radial projections on said driven shaft on either side of said slidable sprocket wheel, a driving device on one side of said slidable sprocket wheel adapted to transmit the rotary movement of the latter in one direction to the driven shaft through contact with one of said radial projections, and means on both sides of said slidable sprocket wheels coöperating with said radial projections, respectively, to effect the engagement and disengagement of said driving device relatively to its coöperating radial projection according to the direction of rotation of said slidable sprocket wheel, substantially as described.

2. The combination with a driving shaft and a sprocket wheel fast thereon, of a driven shaft having a pair of fixed radial projections, a sprocket wheel slidably and rotatably mounted upon said driven shaft between said radial projections, said sprocket wheel having on one side thereof a laterally projecting lug formed with a driving face adapted to engage one of said radial projections to rotate the shaft on its forward movement and with a cam face adapted to engage the same radial projection when said sprocket wheel is turned in the opposite direction to effect a disengagement of said driving face, said sprocket wheel being further provided on its opposite side with a lateral projection having a cam face adapted to engage the other of said radial projections whereby to force said sprocket wheel laterally to driving position, and a sprocket chain connecting said sprocket wheels, substantially as described.

DAVID M. KYLE.

Witnesses:
L. T. MANN,
S. N. POND.